United States Patent

[11] 3,613,815

[72] Inventors John Gary Meylink;
Robert James Bishop, both of Horicon, Wis.
[21] Appl. No. 856,926
[22] Filed Sept. 9, 1969
[45] Patented Oct. 19, 1971
[73] Assignee Deere & Company
Moline, Ill.

[54] TRACTOR AND IMPLEMENT ASSEMBLY
7 Claims, 5 Drawing Figs.
[52] U.S. Cl. ................................................ 180/53,
56/11.7, 180/64, 180/70, 192/18
[51] Int. Cl. ........................................................ B60k 25/02
[50] Field of Search............................................ 180/70, 64,
53; 56/25.4, 26.5, 11.7

[56] References Cited
UNITED STATES PATENTS
3,003,574  10/1961  Strunk............................ 180/70
3,205,642  9/1965  Smith ............................. 180/64 X
3,311,186  3/1967  Kamlukin...................... 180/70

*Primary Examiner*—A. Harry Levy

*Attorneys*—H. Vincent Harsha, Harold M. Knoth, William A. Murray, John M. Nolan and R. L. Hollister

ABSTRACT: A tractor and driven implement assembly in which the tractor has a vertical crankshaft engine carried by an engine support frame. The support frame is carried on the tractor main frame by resilient mounts which isolate engine vibrations from the main frame. The engine crankshaft extends below the support frame and carries a pair of sheaves which are operatively connected to the tractor transmission and driven implement by endless flexible belts. The upper sheave is fixed to the crankshaft for rotation therewith, and the lower sheave is rotatably mounted on the crankshaft and is axially shiftable into selective engagement with the upper sheave for selective rotation therewith. An actuating lever is connected to a horizontal pivot carried by a bracket depending from the engine support frame and is operatively connected to the lower sheave to vertically shift the same into selective engagement with the upper sheave. A stationary brake member for the lower sheave also depends from the engine support frame and engages the lower sheave when the lower sheave is lowered from engagement with the upper sheave.

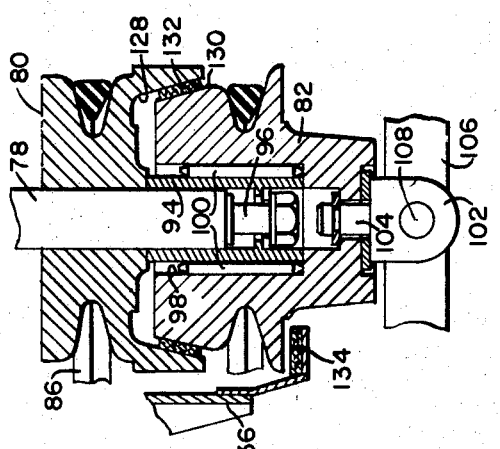
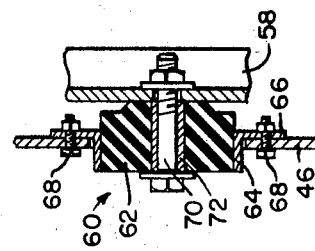
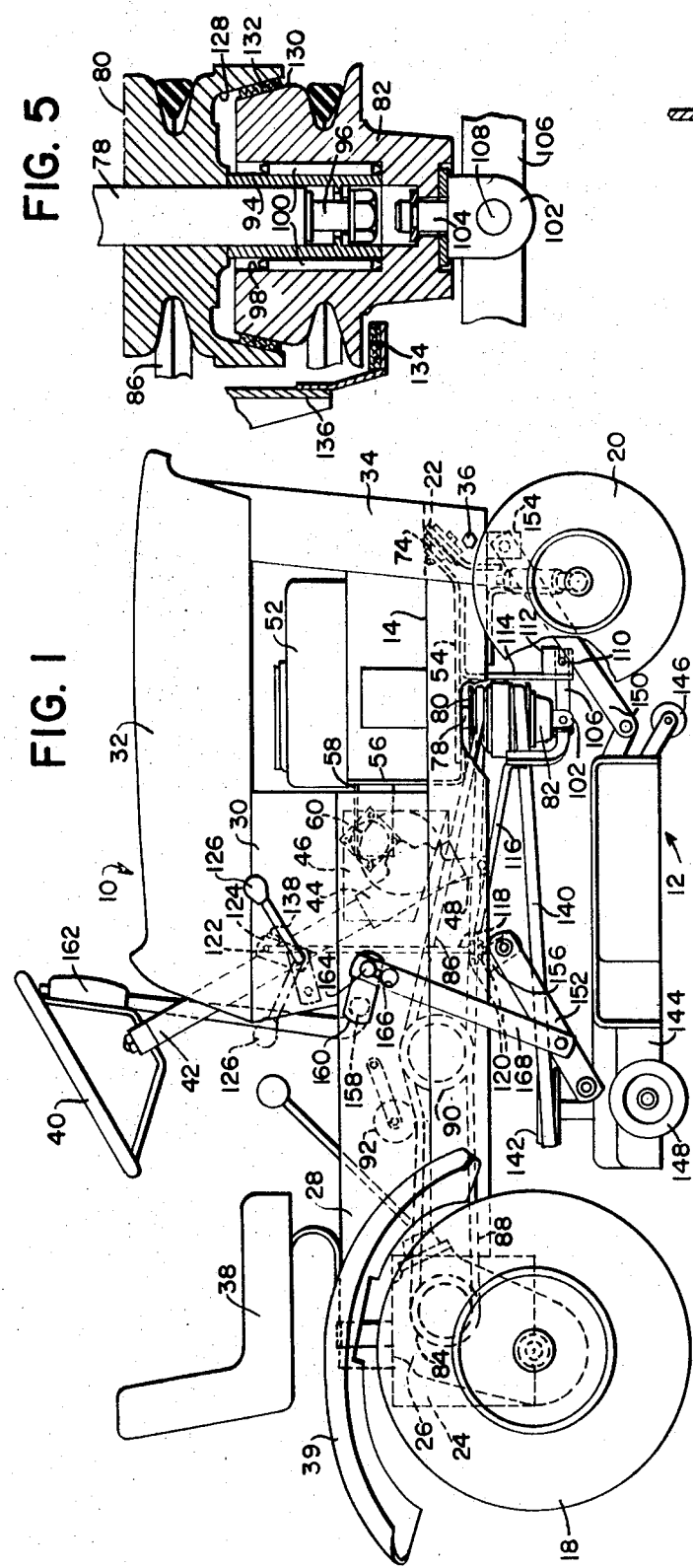
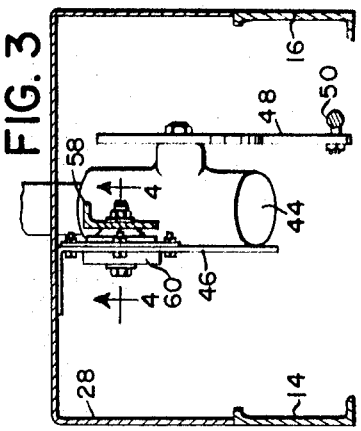
INVENTORS
J.G. MEYLINK &
R.J. BISHOP

TRACTOR AND IMPLEMENT ASSEMBLY

BACKGROUND OF THE INVENTION

The present invention relates generally to a vibration-isolating mounting for an engine and PTO clutch, and more particularly relates to such a mounting for a vertical crankshaft engine which is used on small vehicles such as lawn and garden tractors and riding mowers. Due to the relatively light weight of the frame or chassis of lawn and garden tractors and riding mowers, the engine vibrations pass through the frame and cause great discomfort and fatigue for the operator. Therefore, it becomes necessary to isolate the engine vibrations from the frame. As illustrated in U.S. Pat. No. 3,429,533, which issued to J. R. Harkness on Feb. 25, 1969, the vibrations of a vertical crankshaft engine can be isolated from the vehicle frame by mounting the engine on resilient snubbers or mounts which will prevent excessive engine motion and will absorb most of the engine vibrations. However, the aforementioned U.S. patent does not take into consideration that the engine will provide power for an implement such as a mower as well as for the tractor.

When a lawn and garden tractor is provided with a vertical crankshaft engine, any driven implements are usually powered directly from the engine crankshaft. It is therefore necessary to provide a combination clutch and sheave for the driven implement. The combination clutch and sheave is mounted on the crankshaft for vertical movement and is supported and controlled by an actuating arm which is generally carried by the tractor frame. Unless some means is provided for isolating the combination clutch and sheave from the engine frame, the engine vibrations will be transmitted to the frame through the clutch actuating arm.

SUMMARY OF THE INVENTION

An object of the present invention is to provide a tractor and driven implement assembly in which the tractor has a vertical crankshaft engine with a PTO clutch and sheave mounted on the crankshaft, and in which both the engine and the clutch-actuating mechanism are resiliently mounted on the tractor frame so as to completely isolate engine vibrations from the engine frame.

A further object of the present invention is to provide a tractor and driven implement assembly in which the tractor is provided with a vertical crankshaft engine resiliently supported on the tractor frame by resilient mounts, in which a PTO clutch for the driven implement is mounted on the engine crankshaft, and in which an actuating arm for the PTO clutch is resiliently supported from the tractor frame by the same resilient mounts which support the engine.

The above and additional objects and advantages will become apparent along with the details of construction of the preferred embodiment of the invention from a reading of the following detailed description when taken in conjunction with the accompanying drawing.

BRIEF DESCRIPTION OF THE DRAWING

In the drawing:

FIG. 1 is a side elevation view of a tractor and implement assembly according to the present invention;

FIG. 2 is a top plan view of a forward portion of the tractor illustrated in FIG. 1, parts being removed to illustrate the engine and its mounting;

FIG. 3 is an enlarged sectional view taken substantially along the lines 3—3 of FIG. 2;

FIG. 4 is an enlarged sectional view taken along the lines 4—4 of FIG. 3 and illustrates the construction of one of the motor mounts; and FIG. 5 is an enlarged sectional view of the tractor and implement drive sheaves.

DESCRIPTION OF THE PREFERRED EMBODIMENT

Referring now to the drawings, the tractor of the tractor and implement assembly is indicated generally at 10 and the implement of the assembly takes the form of a mower indicated generally at 12. The tractor includes a main frame or chassis consisting of a pair of spaced longitudinally extending beams 14 and 16 which are carried by rear traction wheels 18 and front steerable wheels 20. The forward end of the frame beams 14 and 16 are maintained in spaced relationship by a spacer plate 22 which extends between and has its opposite ends welded to the frame beams 14 and 16. The rear ends of the frame beams 14 and 16 are connected to and maintained in spaced relationship by a box member 24 which houses a transmission 26.

An inverted elongated channel member 28 is mounted on and bridges the main frame beams 14 and 16 and forms a cover for various components of the tractor drive train. A pair of sidewalls 30 and an instrument panel (not disclosed) are mounted on the forward portion of the inverted channel member 28 and support the rear portion of the tractor hood 32. The forward portion of the tractor hood is supported by a grill 34 which is mounted on the extreme forward ends of the beams 14 and 16 by bolts 36. A seat 38 and rear wheel fenders 39 are supported on the rear end of the inverted channel member 28. The tractor steering wheel 40 is mounted on a steering column 42 which extends downwardly through the instrument panel, between the sidewalls 30, and through the bight portion of the inverted channel member 28. A reduction gear unit 44 is mounted on the lower end of the steering column 42 and is secured to a bracket member 46 which depends from the bight portion of the inverted channel member 28. The reduction gear unit 44 drives a steering arm 48 which is connected to the front steerable wheels by a steering rod 50.

A vertical crankshaft engine 52 is mounted between the frame beams 14 and 16 and forwardly of the inverted channel member 28. The engine 52 is mounted on an engine support frame consisting of a bottom plate 54 and a backwall 56. A right-angle bracket 58 is secured to and extends rearwardly from the backwall 56 of the engine support frame and is secured to the bracket 46 by a resilient mount 60. The mount 60 is best illustrated in FIG. 4 and includes an annular member 62 which is constructed of rubber or other suitable resilient material. The annular member 62 is bonded to a metal ring 64 which is provided with a flanged end which forms a mounting shoulder 66. The ring 64 is inserted through a large opening provided in the bracket 46 and is secured thereto by bolts 68 which extend through the bracket 46 and mounting shoulder 66. The bracket 58 on the backwall 56 of the engine support frame is secured to the mount 60 by a bolt 70 which extends through the annular member 62 and an aperture provided in the bracket 58. A ferrule 72 is positioned within the annular member 62 so that the bolt 70 can be tightened without unduly compressing the resilient annular member 62.

The forward end of the bottom plate 54 of the support frame is bent upwardly at approximately a 45° angle to the horizontal to conform to the upper end of the spacer plate 22 and is supported on the spacer plate 22 by a pair of transversely spaced resilient mounts 74 and 76. The mounts 74 and 76 are identical to the mount 60 and are secured within openings provided in the spacer plate 22. The resilient mounts 60, 74 and 76 constitute the sole support for the engine-supporting frame and therefore any vibrations initiated by the engine 52 would be required to pass through the resilient mounts prior to being passed on to the tractor main frame.

The crankshaft 78 of the engine 52 extends downwardly through a suitable opening provided in the engine support frame and carries a pair of upper and lower pulley members or sheaves 80 and 82. The upper pulley 80 is keyed or otherwise fixed to the lower end of the crankshaft 78 for rotation therewith and is connected to the input sheave 84 of the transmission 26 by first and second endless flexible belts 86 and 88. The belt 86 is trained around sheave 80 and extends back to and is trained around a double-sheave member 90. The belt 88 extends between and is trained around the double-sheave member 90 and the transmission input sheave 84. A spring-loaded idler sheave assembly 92 normally maintains the belt 88 in tension. Although not disclosed, the idler sheave assembly 92 is connected to a suitable clutch pedal so that depression of the pedal will move the idler sheave assembly 92 away from the belt 88 to relieve the tension therein. Also, to prevent loss of tension in the belt 86 due to engine vibrations, a suitable spring-loaded idler can be provided for the belt 86.

The lower sheave 82 functions as a PTO clutch and is rotatably mounted on the lower end of the crankshaft 78, and is also axially shiftable thereon into and out of engagement with the upper sheave 80 for selective rotation therewith. To this end, a bushing 94 is mounted on the lower end of the crankshaft 78 and is retained in position thereon by a bolt 96 which extends into the end of the crankshaft 78. The sheave 82 is provided with an upwardly open bore 98 which extends over the sleeve 94 and a plurality of roller bearings 100 are positioned between the sleeve 94 and the wall of the bore 98. The sleever 94 and the wall of the bore 98 serve as inner and outer races for the bearings 100, but also permit vertical movement of the sheave 82 relative to the lower end of the crankshaft 78.

In order to raise and lower the sheave 82, a fork member 102 is provided with a short stub shaft 104 which is journaled in the lower end of the sheave 82. The legs of the fork member 102 are pivotally connected intermediate the ends of an actuating lever 106 by a pin 108. The forward end of the lever 106 is provided with a cross pin 110 which extends through a horizontal slot provided in an ear 112 on the lower end of a rigid bracket 114 which is secured to and depends from the bottom plate 54 of the engine support frame. The rear end of the actuating arm 106 is rigidly fixed to one end of a rod 116. The rod 116 extends rearwardly and is provided with an elongated slot (undisclosed) at its rear end. The lower end of a control rod 118 extends to the elongated slot provided in the rod 116 and is retained in position thereon by upper and lower nuts 120 threaded on the control rod 118. The control rod 118 extends upwardly and has an offset end portion 122 which extends through a suitable opening provided in a crank arm 124 carried on a shaft which is suitably journaled between the sidewalls 30. One end of the shaft carrying the crank arm 124 extends through the right-hand sidewall 30 and is provided with a manual control lever 126. When the control lever 126 is moved from the position illustrated in solid lines to the alternate position illustrated in dotted lines, the actuating lever 106 is pivoted about the pin 110 to lower the sheave 82. When the lever 126 is returned to its solid line position, the lower sheave 82 is raised. The elongated slot provided in the rear end of the rod 116 and the slot provided in the ear 112 on the lower end of the bracket 114 permit a small amount of longitudinal movement of the actuating lever 106 so that it will not cause the lower sheave 82 to bind on the sleeve 94.

The upper and lower sheaves 80 and 82 are provided with matching tapered surfaces 128 and 130 respectively which move into engagement when the lower sheave is raised by actuation of the control lever 126 so that the lower sheave 82 is caused to rotate with the upper sheave 80. To provide adequate frictional engagement between the upper and lower sheaves, a suitable friction pad 132 is fixed to the tapered surface 128 on the upper sheave 80. When the sheave 82 is lowered by actuation of the control lever 126, it moves into engagement with a friction pad 134 carried by a bracket 136 depending from the bottom plate 54 of the engine support frame. The friction pad 134 constitutes a brake member which quickly stops the rotation of the lower sheave 82 when the sheave 82 is lowered, and also serves as a limit for the downward movement of the sheave 82. It should be noted that when the friction pad 134 determines the limit of downward movement of the sheave 82, it also determines the disengaged or dotted line position of the control lever 126. The engaged or full line position of the control lever 126 is determined by a stop 138. Upon raising the sheave 82, after it has contacted the friction pad 132, the rod 116 will yield so that the crank arm 124 can move to an overcenter position and engage against the stop member 138.

The lower sheave 82 is used to drive the mower 12, and to this end, an endless flexible belt 140 is trained about the sheave 82 and an input sheave 142 on the mower. For the purpose of maintaining the belt 140 tensioned so that it cannot be thrown off of either of the sheaves 82 or 142 due to relative movement between tractor and mower, or due to engine vibration, the sheave 142 is spring loaded as is conventional with tractor-mounted mowers.

The mower 12 includes a housing 144 carried by front and rear wheels 146 and 148. The wheels 146 and 148 serve to gauge the length of which the grass is cut. The mower housing 144 is suspended from the tractor main frame by front and rear parallel draft links 150 and 152 which have their lower ends pivotally connected to the mower housing and their upper ends pivotally connected to suitable brackets 154 and 156 secured to the main frame beams 14 and 16. For the purpose of raising and lowering the mower, a rockshaft 158 is journaled between the legs of the inverted channel member 28 and is provided with crank arms 160 at its opposite ends. The left-hand end of the rockshaft 158 is provided with a manual control lever 162. The crank arms 160 are provided with headed pins 164 which extend through keyhole slots 166 provided in the upper end of suspension links 168. The lower ends of the suspension links 168 are pivotally connected to the rear draft links 152, so that operation of the manual control lever 162 raises and lowers the mower 12.

From the foregoing description, it can be seen that the present invention provides a tractor and driven implement assembly in which the engine vibrations are isolated from the tractor main frame and that the PTO clutch and its actuating mechanism are also isolated from the tractor means.

While a single preferred embodiment of the invention has been described and illustrated, various modifications within the spirit and scope of the invention will become apparent to those skilled in the art and can be made without departing from the underlying principles of the invention.

We claim:
1. In a tractor-implement assembly, in which the tractor has a main frame, traction means, and an engine having a vertical crankshaft and an engine frame, the improvement residing in the combination of vibration-insulating engine mounts supporting the engine frame on the tractor frame for isolating engine vibrations from the tractor frame; upper and lower pulley members on the crankshaft relatively vertically shiftable thereon to afford separate or unified rotation, means affording relative vertical adjustment of the pulley members including an actuating member carried by the engine frame operatively connected to relatively shift the pulley members; and belt drive means extending between the upper and lower pulleys and the tractor traction means and the implement.

2. The assembly set forth in claim 1 wherein the means affording relative vertical adjustment of the pulley members includes a horizontal pivot carried by the engine frame, the actuating member including a lever means carried on the pivot, and control means on the tractor for adjusting the lever means.

3. In a tractor and driven implement assembly in which the tractor includes a main frame carried by traction means and a vertical crankshaft engine mounted on an engine support frame, the improvement residing in the combination of vibration-insulating mounts supporting the engine support frame on the main frame for isolating engine vibrations from the main frame; first rotary drive means coupled to the crankshaft for rotation therewith; second rotary drive means supported on the crankshaft for axial shifting movement into and out of engagement with the first rotary drive means for selective rotation therewith; means affording vertical adjustment of the second drive means including a horizontal pivot carried by a pivot support mounted on the engine frame, lever means carried on the pivot and operatively connected to the second drive means, and control means on the tractor for adjusting the lever means; and first and second flexible drive means operatively interconnecting the first and second rotary drive means with the traction means and the implement respectively 4. The assembly set forth in claim 3 wherein the first and second rotary drive means are provided with cooperating friction surfaces which constitute a clutch means between the first and second rotary drive means, the clutch means being engaged when the second rotary drive means is axially shifted into engagement with the first rotary drive means and disengaged when the second rotary drive means is axially shifted out of engagement with the first rotary drive means.

5. The assembly set forth in claim 4 further including brake means for the second rotary drive means, the brake means including a rigid bracket suspended from the engine support frame and having a friction surface engageable with the second rotary drive means when the clutch means is disengaged.

6. A vehicle including a chassis carried by front and rear wheel means, platform means resiliently mounted on the chassis, an internal combustion engine having a vertical crankshaft that projects downwardly from the crankcase of the engine, the engine being rigidly mounted on the platform means with the crankshaft projecting downwardly through an opening provided in the platform means, first sheave means mounted on the crankshaft for rotation therewith, torque transmitting means including an endless belt trained about the first sheave means drivingly interconnecting the first sheave means and rear wheel means, a friction surface on the lower portion of the first sheave means, a second sheave means mounted on the crankshaft below the first sheave means, the second sheave means being mounted on the crankshaft for vertical and rotary movement relative to the crankshaft, a friction surface on the upper portions of the second sheave means, a stub shaft journaled in the second sheave means and projecting downwardly therefrom, bracket means suspended from the platform means adjacent the first and second sheave means, an actuating arm having one end pivotally mounted on the lower end of the bracket means and being pivotally connected intermediate its ends to the stub shaft, and means to raise and lower the actuating arm about its pivotal connection with the bracket means.

7. The vehicle set forth in claim 6 further including brake means for the second sheave means, the brake means comprising second bracket means suspended from the platform means adjacent the second sheave means, the lower portion of the second bracket means extending generally horizontally beneath the second sheave means and having an upwardly facing friction surface engageable with a downwardly facing surface on the second sheave means when the second sheave means is lowered.